United States Patent
Chae et al.

(10) Patent No.: US 9,768,679 B2
(45) Date of Patent: Sep. 19, 2017

(54) APPARATUS AND METHOD FOR RESTARTING MEDIUM VOLTAGE INVERTER

(71) Applicant: LSIS CO., LTD., Anyang-si, Gyeonggi-do (KR)

(72) Inventors: Beom Seok Chae, Gunpo-si (KR); Seung Cheol Choi, Anyang-si (KR)

(73) Assignee: LSIS CO., LTD., Anyang-si (KR)

(*) Notice: Subject to any disclaimer, the term of this patent is extended or adjusted under 35 U.S.C. 154(b) by 0 days.

(21) Appl. No.: 14/866,690

(22) Filed: Sep. 25, 2015

(65) Prior Publication Data
US 2016/0111953 A1    Apr. 21, 2016

(30) Foreign Application Priority Data
Oct. 15, 2014   (KR) .................... 10-2014-0138880

(51) Int. Cl.
*H02P 1/30*   (2006.01)
*H02M 1/36*   (2007.01)
*H02P 27/04*  (2016.01)
*H02P 1/02*   (2006.01)
*H02P 21/14*  (2016.01)
(Continued)

(52) U.S. Cl.
CPC ............. *H02M 1/36* (2013.01); *H02P 1/028* (2013.01); *H02P 1/029* (2013.01); *H02P 21/14* (2013.01); *H02P 21/146* (2013.01); *H02P 23/14* (2013.01); *H02P 27/047* (2013.01); *H02P 27/06* (2013.01)

(58) Field of Classification Search
CPC .. H02M 1/36; H02P 1/28; H02P 1/029; H02P 21/14; H02P 21/146; H02P 23/14; H02P 27/047; H02P 27/06

USPC ..... 318/503, 727, 700, 400.01, 400.04, 606, 318/607, 148, 723, 807, 827; 361/157; 327/8, 9; 324/166
See application file for complete search history.

(56) References Cited

U.S. PATENT DOCUMENTS

| | | | | |
|---|---|---|---|---|
| 3,593,103 | A * | 7/1971 | Chandler | H02M 7/525 318/808 |
| 4,527,214 | A * | 7/1985 | Hattori | H02H 3/0935 361/24 |
| 4,607,205 | A | 8/1986 | Kito et al. | |

(Continued)

FOREIGN PATENT DOCUMENTS

| | | |
|---|---|---|
| DE | 10213563 | 9/2003 |
| EP | 2874305 | 5/2015 |

(Continued)

OTHER PUBLICATIONS

European Patent Office Application Serial No. 15188607.4, Search Report dated Feb. 15, 2016, 9 pages.

(Continued)

*Primary Examiner* — Rita Leykin
(74) *Attorney, Agent, or Firm* — Lee, Hong, Degerman, Kang & Waimey PC

(57) ABSTRACT

An apparatus for restarting a medium voltage inverter is disclosed, wherein the medium voltage inverter can be restarted by estimating a rotor speed when an input power returns from an instantaneous defective state to a normal state, whereby a time to restart the medium voltage inverter can be reduced by a simple configuration to dispense with the need to wait until the rotor speed reaches zero speed.

10 Claims, 8 Drawing Sheets

(51) Int. Cl.
*H02P 27/06* (2006.01)
*H02P 23/14* (2006.01)

(56) References Cited

U.S. PATENT DOCUMENTS

| | | | | |
|---|---|---|---|---|
| 4,734,634 | A * | 3/1988 | Kito | H02P 29/025 139/1 E |
| 4,839,589 | A * | 6/1989 | Heinle | G01P 3/48 318/801 |
| 4,876,637 | A * | 10/1989 | Mose | H02M 5/4505 318/802 |
| 5,923,196 | A * | 7/1999 | Okamoto | H03K 3/03 327/147 |
| 6,388,416 | B1 * | 5/2002 | Nakatani | H02P 6/085 318/700 |
| 6,815,924 | B1 * | 11/2004 | Iura | H02P 21/34 318/727 |
| 7,005,825 | B2 * | 2/2006 | Eguchi | H02P 21/22 318/727 |
| 7,091,690 | B1 * | 8/2006 | Oka | H02P 1/029 318/727 |
| 7,317,292 | B2 * | 1/2008 | Iura | H02P 23/20 318/434 |
| 7,372,302 | B1 * | 5/2008 | Ohshima | H03K 19/017581 326/16 |
| 7,411,309 | B2 * | 8/2008 | Hudson | F03D 7/0272 290/44 |
| 8,519,664 | B2 * | 8/2013 | Rongve | H02P 23/14 174/68.1 |
| 8,736,206 | B2 * | 5/2014 | Kono | H02P 21/26 318/400.01 |
| 8,816,622 | B2 * | 8/2014 | Kato | H02P 21/26 318/400.02 |
| 8,970,159 | B2 * | 3/2015 | Choi | H02P 29/022 318/800 |
| 9,231,512 | B2 * | 1/2016 | Gao | H02P 23/14 |
| 9,331,595 | B2 * | 5/2016 | Yoo | H02M 5/458 |
| 9,419,550 | B2 * | 8/2016 | Kim | H02P 21/06 |
| 2008/0152325 | A1 * | 6/2008 | Bae | H02P 6/182 388/811 |
| 2013/0154536 | A1 * | 6/2013 | Park | H02M 7/797 318/503 |
| 2015/0108932 | A1 * | 4/2015 | Yoo | H02P 23/14 318/430 |

FOREIGN PATENT DOCUMENTS

| | | |
|---|---|---|
| JP | H01129786 | 5/1989 |
| JP | H08336296 | 12/1996 |
| JP | 2002281795 | 9/2002 |
| JP | 2008141935 | 6/2008 |

OTHER PUBLICATIONS

Japanese Patent Application No. 2015-200099, Office Action dated Aug. 30, 2016, 2 pages.

* cited by examiner

APPARATUS AND METHOD FOR RESTARTING MEDIUM VOLTAGE INVERTER

CROSS-REFERENCE TO RELATED APPLICATION

Pursuant to 35 U.S.C. §119(a), this application claims the benefit of earlier filing date and right of priority to Korean Patent Application No. 10-2014-0138880, filed on Oct. 15, 2014, the contents of which are all hereby incorporated by reference herein in its entirety.

BACKGROUND OF THE DISCLOSURE

Field

The teachings in accordance with the exemplary embodiments of this present disclosure generally relate to an apparatus and method for restarting a medium voltage inverter.

Background

In general, a multilevel medium voltage inverter means an inverter having an input power whose rms (root mean square) value is over 600V for a line-to-line voltage, and has several stages in output phase voltage. The multilevel medium voltage inverter is generally used to drive a large capacity motor ranging from several kW to several MW capacities.

A medium voltage motor driven by a medium voltage inverter generally has a large inertia, such that a rotor speed of the medium voltage motor hardly decreases to a great extent, even if an inverter unit of the medium voltage inverter fails to perform a normal operation due to instantaneous failure or instantaneous blackout of input power. Owning to this reason, the medium voltage motor must be re-started after waiting until the rotor speed reaches zero speed when the input power is returned from failure to a normal state.

SUMMARY OF THE DISCLOSURE

The present disclosure is to provide an apparatus and a method for restarting a medium voltage inverter configured to stably restart the medium voltage inverter by estimating a rotor speed of a medium voltage motor in a simple manner when an input power returns from an instantaneous defective state to a normal state.

In one general aspect of the present disclosure, there is provided an apparatus for restarting a medium voltage inverter, the apparatus comprising:
a measurement unit configured to measure an induced voltage of a motor;
an estimation unit configured to estimate a rotor speed of the motor using the induced voltage; and
a controller configured to controllably change an output voltage or an output frequency of the inverter in response to a first ratio corresponding to a frequency relative to a predetermined voltage using the induced voltage and the rotor speed, wherein
the estimation unit includes,
a generation unit configured to generate a first voltage corresponding to a frequency applied by the medium voltage inverter from an induced voltage of the motor and a second voltage substantially lagging by 90° in phase from the first voltage, a determination unit configured to determine a control bandwidth for determining a frequency of the induced voltage of the motor, and
a second detection unit configured to determine the rotor speed based on the control bandwidth.

Preferably, but not necessarily, the estimation unit may further include a normalization unit configured to normalize the first and second voltages.

Preferably, but not necessarily, the controller may maintain an output frequency of the inverter and increase the output voltage until the second ratio reaches the first ratio when the second ratio corresponding to the rotor speed relative to the induced voltage is smaller than the first ratio.

Preferably, but not necessarily, the controller may increase the output voltage and output frequency of the inverter in response to the first ratio when the second ratio reaches the first ratio.

Preferably, but not necessarily, the controller may maintain an output voltage of the inverter and increase the output frequency until the second ratio reaches the first ratio when the second ratio corresponding to the rotor speed relative to the induced voltage is greater than the first ratio.

Preferably, but not necessarily, the controller may increase the output voltage and output frequency of the inverter in response to the first ratio when the second ratio reaches the first ratio.

In another general aspect of the present disclosure, there is provided a method for restarting a medium voltage inverter, the method comprising:
generating a first voltage corresponding to a frequency applied by the medium voltage inverter from an induced voltage of a motor and a second voltage substantially lagging by 90° in phase from the first voltage;
determining a control bandwidth to determine a frequency of an output voltage of the motor; and
estimating a rotor speed of the motor based on the control bandwidth.

Preferably, but not necessarily, the method may further comprise: maintaining an output frequency of the inverter and increasing an output voltage until a second ratio reaches a first ratio when the first ratio corresponding to a frequency relative to a predetermined voltage is smaller than the second ratio corresponding to the rotor speed relative to the induced voltage.

Preferably, but not necessarily, the method may further comprise: increasing the output voltage and the output frequency of the inverter in response to the first ratio when the second ratio reaches the first ratio.

Preferably, but not necessarily, the method may further comprise: maintaining an output voltage of the inverter and increasing an output frequency until a second ratio reaches a first ratio when the first ratio corresponding to a frequency relative to a predetermined voltage is greater than the second ratio corresponding to the rotor speed relative to the induced voltage.

Preferably, but not necessarily, the method may further comprise: increasing the output voltage and the output frequency of the inverter in response to the first ratio when the second ratio reaches the first ratio.

ADVANTAGEOUS EFFECTS OF THE DISCLOSURE

The apparatus and the method for restarting a medium voltage inverter according to the exemplary embodiments of the present disclosure have an advantageous effect in that the medium voltage inverter can be restarted by estimating a rotor speed when an input power returns from an instantaneous defective state to a normal state, whereby a time to restart the medium voltage inverter can be reduced by a simple configuration to dispense with the need to wait until the rotor speed reaches zero speed.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present disclosure will be described in detail with reference to the accompanying drawings.

Figure 1:
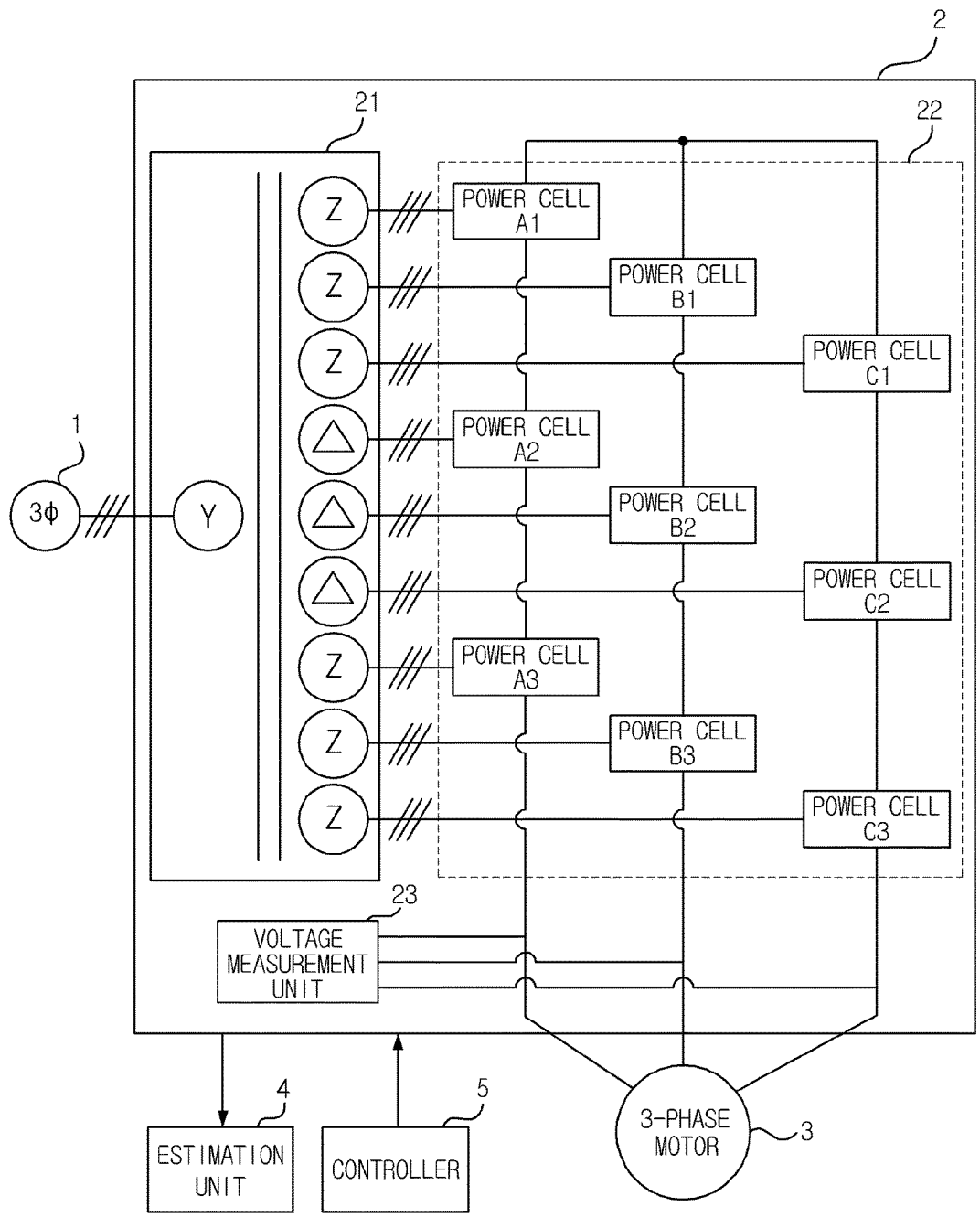
FIG. 1 is a block diagram illustrating a medium voltage inverter system according to an exemplary embodiment of the present disclosure.

FIG. 1 is a block diagram illustrating a medium voltage inverter system according to an exemplary embodiment of the present disclosure, where an H-bridge multilevel inverter using the cascade configuration is exemplified. Although FIG. 1 has illustrated that each group includes three unit power cells, the present disclosure is not limited thereto and other types of medium voltage inverter may be applied. It should be also appreciated by the skilled in the art that the number of unit power cells may be changed in response to output voltage.

Referring to FIG. 1, a medium voltage inverter (2) configured to receive a power from a power supply unit (1) and to supply the power to a 3-phase motor (3) in a medium voltage inverter system according to an exemplary embodiment of the present disclosure may include a phase shift transformer (21), a plurality of unit power cells (22) and a voltage measurement unit (23). Furthermore, the system of the present disclosure may further include an estimation unit (4) configured to estimate a rotor speed of the motor by receiving a current and voltage information necessary for the medium voltage inverter (2), and a controller (5) configured to control the medium voltage inverter (2) using the estimation unit (4).

The power supply unit (1) supplies, to the motor (3), a 3-phase power whose rms (root mean square) value is over 600V for a line-to-line voltage. Furthermore, the motor (3) of the present disclosure is a medium voltage 3-phase motor, and may be an induction machine or a synchronous machine, for example, but the present disclosure is not limited thereto and various types of motors may be applied to the present disclosure.

The phase shift transformer (21) of the medium voltage inverter (2) may provide an electrical insulation between the power supply unit (1) and the medium voltage inverter (2) and may reduce harmonics at an input terminal to provide an input 3-phase power to the unit power cells (22). A phase shift angle of the phase shift transformer (21) may be determined by the number of unit power cells (22). The unit power cells (22) output a phase voltage to be supplied to the motor (3) by receiving a power from the phase shift transformer (21).

Each unit power cell (22) is constituted by three groups in response to each 3-phase voltage of the motor (3), and FIG. 1 has illustrated that the unit power cells, A1, A2 and A3 are connected in series and the voltages outputted from serially-connected unit power cells are synthesized to be provided to the motor (3) as a phase voltage. Likewise, the unit power cells, B1, B2 and B3 are connected in series and the voltages outputted from serially-connected unit power cells are synthesized to be provided to the motor (3) as b phase voltage. Furthermore, the unit power cells, C1, C2 and C3 are connected in series and the voltages outputted from serially-connected unit power cells are synthesized to be provided to the motor (3) as c phase voltage. The synthesized b phase voltage and a phase voltage has a phase difference of 120°, and the synthesized c phase voltage and b phase voltage also has a phase difference of 120°.

The voltage measurement unit (23) may measure a voltage inputted to the motor (3). The voltage measurement unit (23) may be formed with a passive element consisted of a voltage sensor or a resistor.

With reference to the estimation of rotor speed in the medium voltage inverter thus discussed, the present disclosure will be described in detail after discussion of the prior art.

Figure 2:
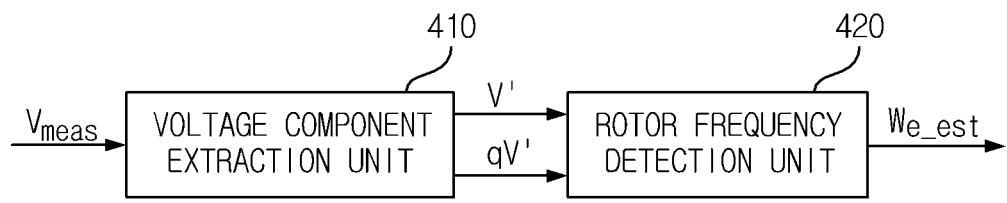
FIG. 2 is a block diagram illustrating a rotor speed estimation unit according to prior art.
Figure 3A:
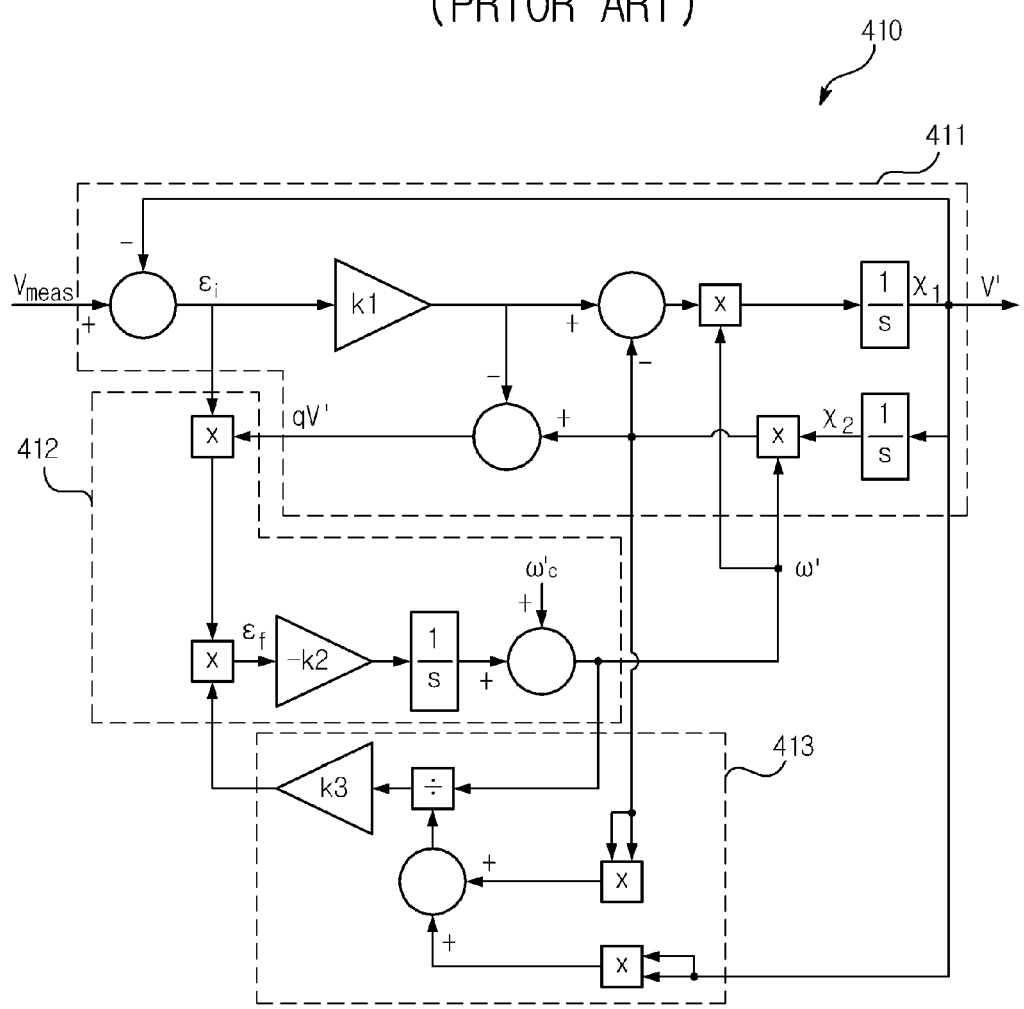
FIGS. 3a and 3b are respectively detailed block diagrams illustrating a voltage component extraction unit and a rotor speed detection unit of FIG. 2.
Figure 3B:
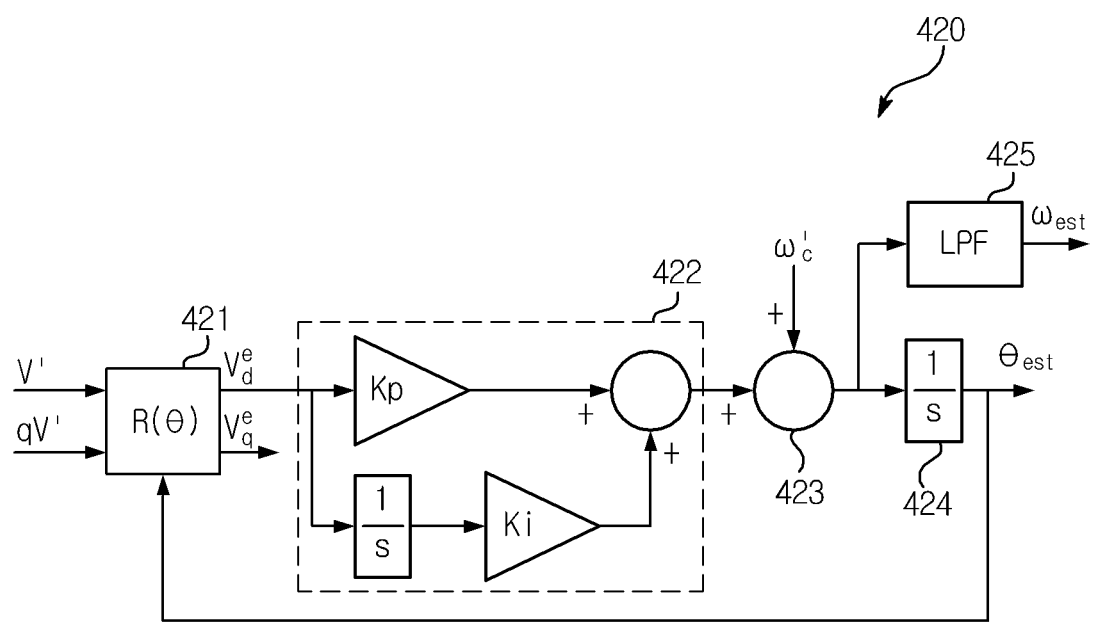

FIG. 2 is a block diagram illustrating a rotor speed estimation unit according to prior art, in which the rotor speed estimation unit includes a voltage component extraction unit (410) and a rotor speed detection unit (420). FIGS. 3a and 3b are respectively detailed block diagrams illustrating the voltage component extraction unit (410) and the rotor speed detection unit (420) of FIG. 2.

The voltage component extraction unit (410) may measure a frequency of an induced voltage of the motor (3) from an induced voltage or line-to-line voltage of the motor (3), where a first unit (411) may generate an AC (Alternating Current) signal V' corresponding to a frequency applied by the medium voltage inverter from the induced voltage of the motor (3), and a signal qV' lagging by 90° in phase from V', and the second unit (412) may detect a frequency from the induced voltage of the motor (3) and the third unit (413) may determine a control bandwidth when a frequency of an output phase voltage of the motor is detected.

The rotor speed detection unit (420) of FIG. 3b may allow the first unit (421) to perform a rotational coordinate transformation, and the second unit to perform a proportional integral compensation, whereby an output $V_d^e$ of the first unit (421) is made zero (0). When the third unit (423) adds an initial frequency to an output of the second unit (422) and a fourth unit (424) integrates the add value, an estimated phase angle ($\Theta_{est}$) is outputted. Furthermore, a finally estimated frequency ($\omega_{est}$) is outputted by low-passing an output of the third unit (425).

At this time, the second unit (422) in the conventional rotor speed detection unit (420) is used for the proportional integral compensation in order to make zero (0) the output $V_d^e$ outputted by being coordinate-transformed, which is generally called PLL (Phase Locked Loop).

However, the PLL circuit has disadvantages in that the estimation unit (4) takes too much estimation time and response of the controller (5) is too slow, and realization thereof is too much complicated.

The present disclosure is provided to remove the PLL circuit that is used in the prior art and to estimate a rotor speed of the motor (3) using a simpler circuit.

Figure 4:
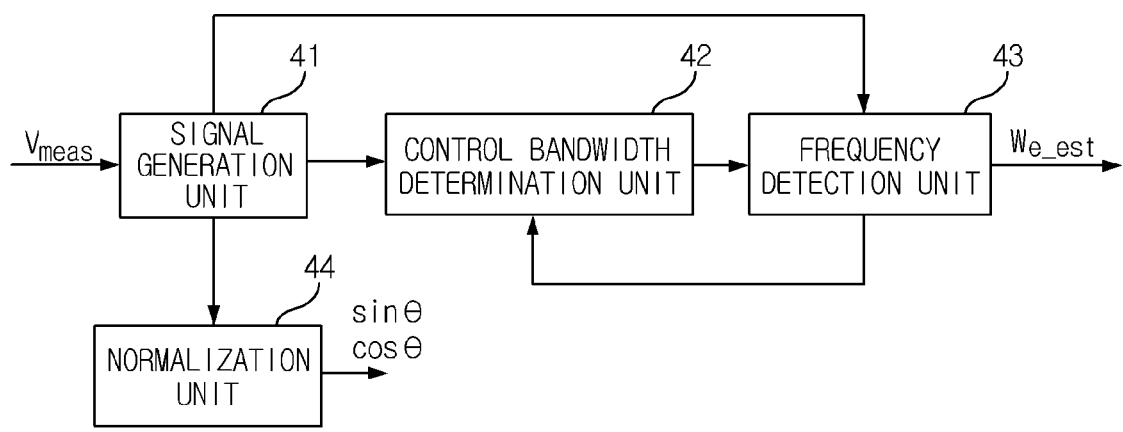
FIG. 4 is a schematic block diagram illustrating a rotor speed estimation unit according to an exemplary embodiment of the present disclosure.
Figure 5:
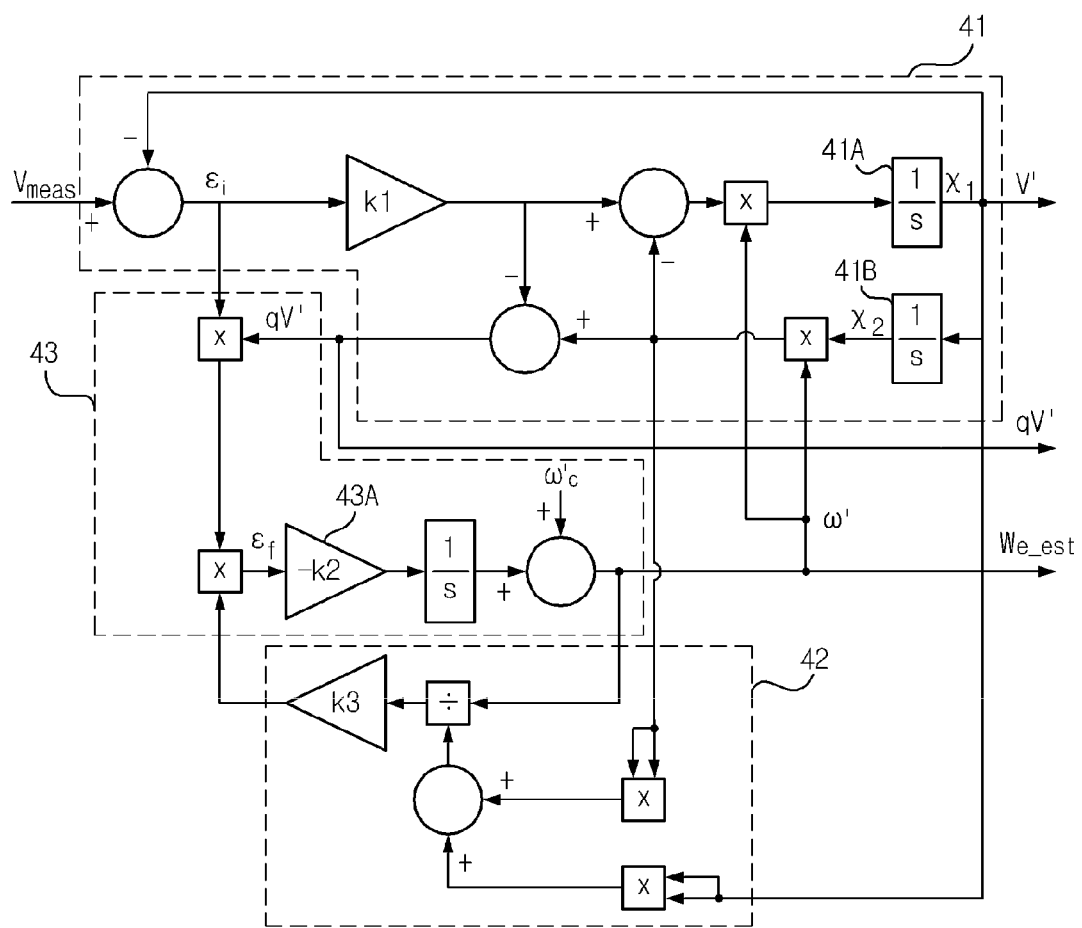
FIG. 5 is a detailed circuit diagram of FIG. 4.

FIG. 4 is a schematic block diagram illustrating a rotor speed estimation unit (4) according to an exemplary embodiment of the present disclosure, and FIG. 5 is a detailed circuit diagram of FIG. 4.

In description of the present disclosure, although the estimation unit (4) has illustrated a case of bringing forth single phase voltage information, it should be also apparent to the skilled in the art that an estimation unit may be used to 3-phase voltage in the present disclosure.

Referring to FIGS. 4 and 5, an apparatus for restarting a medium voltage inverter according to the present disclosure may include a signal generation unit (41), a control bandwidth determination unit (42) and a frequency detection unit (43), and may further include a normalization unit (44).

The signal generation unit (41) may generate an AC (Alternating Current) signal V' corresponding to a frequency applied by a medium voltage inverter (2), and a signal qV' lagging by 90° in phase from V' by receiving an induced voltage of a motor (3) or a line-to-line voltage Vmeas from a voltage measurement unit (23).

If a frequency of the induced voltage ($V_{meas}$) of the motor (3) is given as $\omega'$, V' and qV' determined by the signal generation unit (41) may be expressed by the following Equations.

$$D(s) = \frac{V'(s)}{V_{meas}(s)} = \frac{k_1 \omega' s}{s^2 + k_1 \omega' s + \omega'^2}$$ [Equation 1]

$$Q(s) = \frac{qV'(s)}{V_{meas}(s)} = \frac{k_1 \omega'^2}{s^2 + k_1 \omega' s + \omega'^2}$$ [Equation 2]

wherein V' is AC (Alternating Current) signal corresponding to a frequency applied by a medium voltage inverter, qV' is lagging by 90° in phase from V', $k_1$ is a gain in 41, $\omega'$ is a frequency of the induced voltage ($V_{meas}$) of the motor, and s is a complex frequency.

Only the frequency component of $\omega'$ can be extracted from the induced voltage of the motor measured by the Equation 1, and a signal lagging by 90 degrees from the component detected by the Equation 1 can be determined by the Equation 2.

The control bandwidth determination unit (42) may determine a control bandwidth for determining a frequency of an output phase voltage from the motor, and the frequency detection unit (43) may detect a frequency of induced voltage of the motor based on the control bandwidth.

Now, operation of the control bandwidth determination unit (42) and the frequency detection unit (43) will be explained. When outputs of 41A and 41B of the signal generation unit (41) are respectively defined as $x_1$ and $x_2$, the following equations may be derived:

$$\dot{x} = \begin{bmatrix} \dot{x}_1 \\ \dot{x}_2 \end{bmatrix} = Ax + Bv = \begin{bmatrix} -k_1\omega' & -\omega'^2 \\ 1 & 0 \end{bmatrix}\begin{bmatrix} x_1 \\ x_2 \end{bmatrix} + \begin{bmatrix} k_1\omega' \\ 0 \end{bmatrix}V_{meas}$$ [Equation 3]

$$y = \begin{bmatrix} V' \\ qV' \end{bmatrix} = Cx = \begin{bmatrix} 1 & 0 \\ 0 & \omega' \end{bmatrix}\begin{bmatrix} x_1 \\ x_2 \end{bmatrix}$$ [Equation 4]

Wherein $x_1$ is an output of 41A, and $x_2$ is an output of 41B.

At this time, Equation 5 may be expressed as under, and condition of Equation 6 may be satisfied in a normal state.

$$\omega' = -k_2 x_2 \omega'(V_{meas} - x_1)$$ [Equation 5]

Wherein $k_2$ is a gain in 43A.

$$\omega' = 0$$

$$\omega = \omega'$$

$$x_1 = V_{meas}$$ [Equation 6]

The following Equation 7 may be derived from Equation 3 using the condition of Equation 6.

$$\dot{\bar{x}}|_{\omega'=0} = \begin{bmatrix} \dot{\bar{x}}_1 \\ \dot{\bar{x}}_2 \end{bmatrix} = \begin{bmatrix} 0 & -\omega'^2 \\ 1 & 0 \end{bmatrix}\begin{bmatrix} \bar{x}_1 \\ \bar{x}_2 \end{bmatrix}$$ [Equation 7]

Equation 8 may be derived from the Equation 7.

$$\bar{x}_1 = -\omega^2 \bar{x}_2$$ [Equation 8]

The following Equations 9 and 10 may be obtained using average of each variable in FIG. 5.

$$\bar{\varepsilon}_i = V_{meas} - \bar{x}_1 = \frac{1}{k_1\omega'}(\dot{\bar{x}}_1 + \omega'^2 \bar{x}_2)$$ [Equation 9]

Wherein $\varepsilon_i$ and $\varepsilon_f$ are intermidiate values in 41 and 43 respectively.

$$\bar{\varepsilon}_{f=\omega'} \cdot \bar{x}_2 \bar{\varepsilon}_i = \frac{\bar{x}_2^2}{k_1}(\omega'^2 - \omega^2)$$ [Equation 10]

($\omega'^2 - \omega^2$) in the above Equation 10 may be simplified as $2\omega'(\omega'-\omega)(\because \omega' \cong \omega)$, where an estimation frequency may have the following control bandwidth when using the control bandwidth determination unit (42).

$$\frac{\bar{\omega}'}{\omega} = \frac{k_2}{s + k_2}$$ [Equation 11]

It can be noted that the control bandwidth seeking a desired frequency from the above Equation 11 is determined by a gain of an amplification unit (42A) in the frequency detection unit (42). Thus, the gain (k2) of the amplification unit (42A) is preferably determined by a value higher than an operational frequency of the motor (3).

The frequency detection unit (43) may detect a frequency of induced voltage of the motor by receiving outputs from the control bandwidth determination unit (42) and the signal generation unit (41).

Meantime, the normalization unit (44) may normalize V' and qV' generated by the signal generation unit (41). Outputs of the normalization unit (44) are trigonometric functions, sine, cos θ. That is, the output of the normalization unit (44) is a normalized sinusoidal function.

According to the apparatus for restarting the medium voltage inverter as illustrated in FIGS. 2 and 3a/3b, the apparatus must go through a PLL circuit of the rotor speed detection unit, which makes a response slow and realization complicated. However, the present disclosure has an advantage of fast response and simple realization by removing the PLL circuit.

Figure 6:
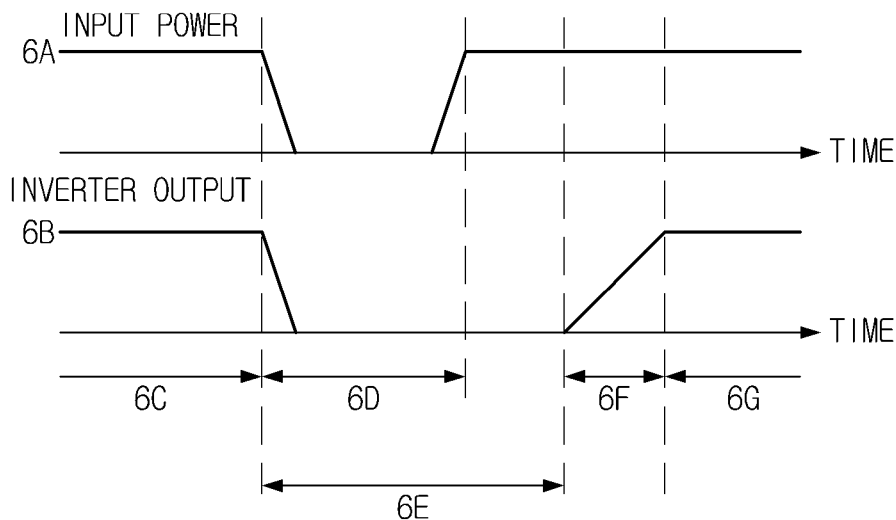
FIG. 6 is a schematic view illustrating a sequence of the medium voltage inverter according to the present disclosure.

FIG. 6 is a schematic view illustrating a sequence of the medium voltage inverter according to the present disclosure.

The reference numeral 6A in FIG. 6 graphically shows an input power inputted to the medium voltage inverter (2) from the power supply unit (1), and 6B denotes an output voltage of the medium voltage inverter (2). Furthermore, 6C and 6G are areas where both the power supply unit (1) and the medium voltage inverter (2) operate normally, 6D is an area where an output voltage of the medium voltage inverter (2) is reduced due to generation of abnormalcy at the input power, 6E is an area where the estimation unit (4) estimates the rotor speed of the motor (3) and the induced voltage of the motor (3), and 6F is an area where the controller (5) restarts the medium voltage inverter (2) according to the rotor speed of the motor (3) and the induced voltage of the motor (3) as estimated by the present disclosure.

Now, operation of the controller (5) will be described.

In general, the medium voltage inverter (2) operates in response to a pattern where voltage and frequency are predetermined when running a constant flux operation as V/F operation. If an input power is generated an abnormality to make a ratio between the estimated output voltage and the output frequency smaller or greater than a predetermined value (Vset/Fset), the controller (5) changes the sizes of the voltage or frequency until reaching a predetermined voltage and frequency.

Figure 7:
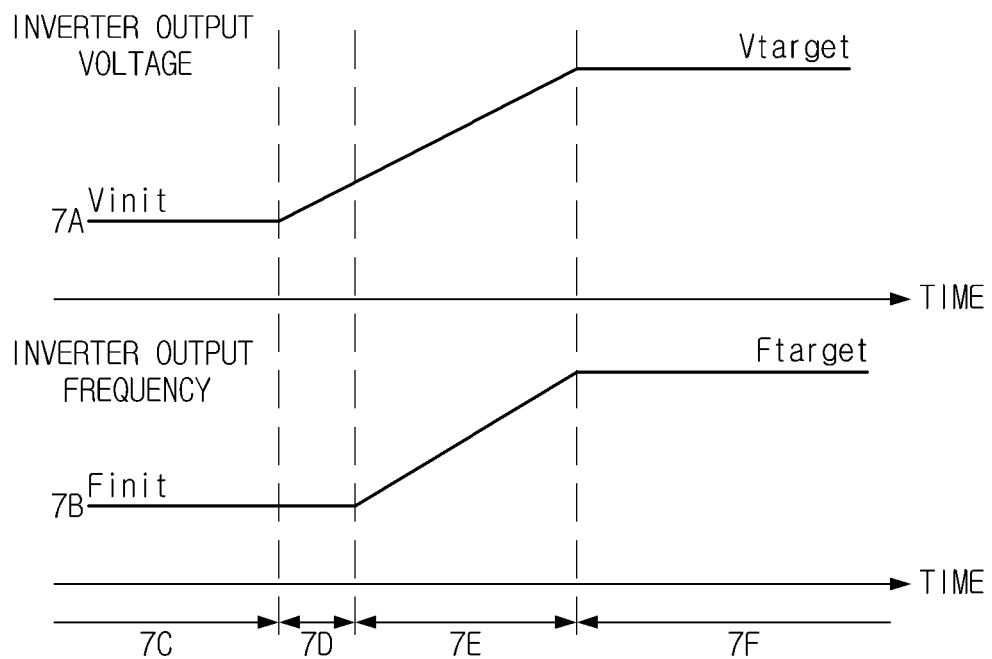
FIG. 7 is a schematic view illustrating operation of a controller when an estimated voltage-frequency ratio is less than a predetermined voltage-frequency ratio.

FIG. 7 is a schematic view illustrating operation of a controller when an estimated voltage-frequency ratio is less than a predetermined voltage-frequency ratio, and illustrates a segmented operation at 6F section in FIG. 6.

The reference numeral 7A in FIG. 7 illustrates an output voltage of the inverter (2), 7B illustrates an output frequency of the inverter (2). Furthermore, an initial voltage (Vinit) which is an output voltage at 7C section may be received from the voltage measurement unit (23), and an initial frequency (Finit) which is an output frequency of the inverter (2) may be same as the output of the frequency detection unit (43) of FIG. 4.

In 7D area of FIG. 7, the controller (5) may maintain the frequency until reaching a predetermined voltage-frequency ratio and increase the voltage. Furthermore, the controller (5) in 7E area may simultaneously increase the voltage and the frequency in response to a predetermined voltage-frequency ratio, whereby the inverter (2) can operate in 7F area at a voltage (Vtarget) and a frequency (Ftarget) selected at the time of normal operation.

Figure 8:
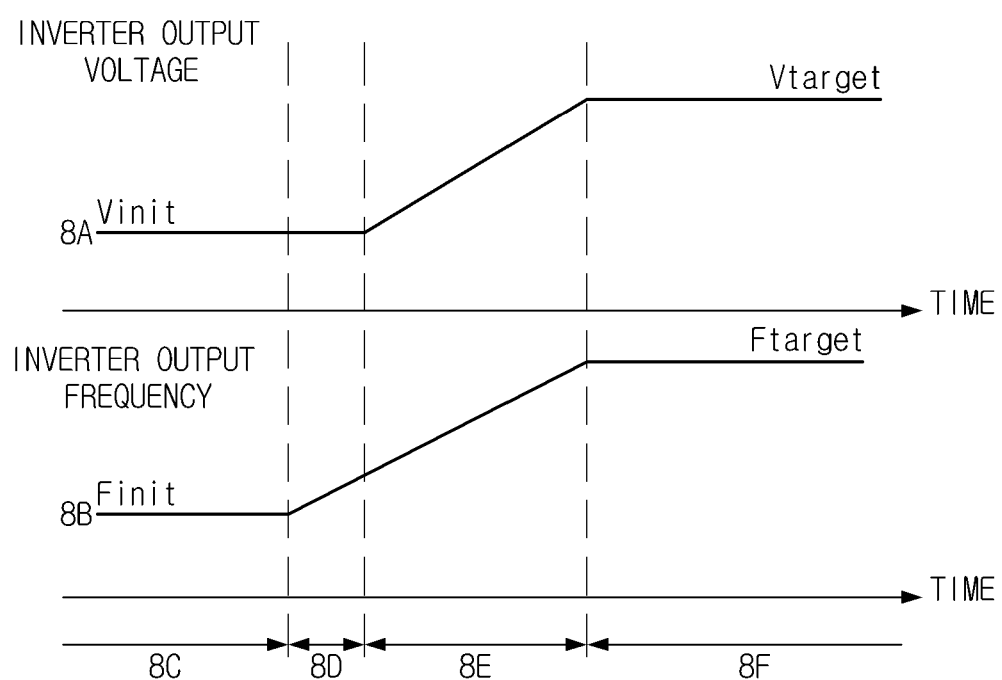
FIG. 8 is a schematic view illustrating operation of a controller when an estimated voltage-frequency ratio is greater than a predetermined voltage-frequency ratio.

FIG. 8 is a schematic view illustrating operation of a controller when an estimated voltage-frequency ratio is greater than a predetermined voltage-frequency ratio, and illustrates a segmented operation at 6F section in FIG. 6.

The reference numeral 8A of FIG. 8 illustrates an output voltage of the inverter (2), and 8B illustrates an output frequency of the inverter (2). Furthermore, an initial voltage (Vinit) in 8C section which is an output voltage of inverter may be received from the voltage measurement unit (23), and an initial frequency (Finit) which is an output frequency of inverter (2) may be same as the output of the frequency detection unit (43) of FIG. 4.

In 8D area of FIG. 8, the controller (5) may maintain the voltage until reaching a predetermined voltage-frequency ratio and increase the size of the frequency. Furthermore, the controller (5) in 8E area may simultaneously increase the voltage and the frequency in response to a predetermined voltage-frequency ratio, whereby the inverter (2) can operate in 8F area at a voltage (Vtarget) and a frequency (Ftarget) selected at the time of normal operation.

The apparatus for restarting a medium voltage inverter according to the present disclosure can measure an induced voltage of the inverter (2) and estimate a rotor speed of a motor by extracting a frequency component of the measured voltage, increase an output voltage or an output frequency of the inverter until reaching a predetermined voltage-frequency ratio, and re-start by simultaneously increasing the output voltage and output frequency when a voltage or a frequency reaches a predetermined voltage-frequency ratio Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

What is claimed is:

1. An apparatus for restarting a medium voltage inverter, the apparatus comprising:
   a measurement unit configured to measure an induced voltage of a motor;
   an estimation unit configured to estimate a rotor speed of the motor using the induced voltage; and
   a controller configured to controllably change an output voltage or an output frequency of the inverter in response to a first ratio corresponding to a frequency relative to a predetermined voltage using the induced voltage and the rotor speed,
   wherein the estimation unit includes:
   a generation unit configured to generate a first voltage corresponding to a frequency applied by the medium voltage inverter from an induced voltage of the motor by the inverter and a second voltage substantially lagging by 90° in phase from the first voltage,
   a determination unit configured to determine a control bandwidth for determining a frequency of the induced voltage of the motor,
   a second detection unit configured to determine the rotor speed based on the control bandwidth; and
   a normalization unit configured to normalize the first and second voltages as separate voltages generated by the generation unit.

2. The apparatus of claim 1, wherein the controller maintains an output frequency of the inverter and increases the output voltage until a second ratio reaches the first ratio when the second ratio corresponding to the rotor speed relative to the induced voltage is smaller than the first ratio.

3. The apparatus of claim 2, wherein the controller increases the output voltage and output frequency of the inverter in response to the first ratio when the second ratio reaches the first ratio.

4. The apparatus of claim 1, wherein the controller maintains an output voltage of the inverter and increases the output frequency until the second ratio reaches the first ratio when the second ratio corresponding to the rotor speed relative to the induced voltage is greater than the first ratio.

5. The apparatus of claim 4, wherein the controller increases the output voltage and output frequency of the inverter in response to the first ratio when the second ratio reaches the first ratio.

6. A method for restarting a medium voltage inverter, the method comprising:
- generating a first voltage corresponding to a frequency applied by the medium voltage inverter from an induced voltage of a motor and a second voltage substantially lagging by 90° in phase from the first voltage;
- determining a control bandwidth to determine a frequency of an output voltage of the motor;
- estimating a rotor speed of the motor based on the control bandwidth; and
- normalizing the first and second generated voltages as separate voltages.

7. The method of claim 6, further comprising: maintaining an output frequency of the inverter and increasing an output voltage until a second ratio reaches a first ratio when the first ratio corresponding to a frequency relative to a predetermined voltage is smaller than the second ratio corresponding to the rotor speed relative to the induced voltage.

8. The method of claim 7, further comprising: increasing the output voltage and the output frequency of the inverter in response to the first ratio when the second ratio reaches the first ratio.

9. The method of claim 6, further comprising: maintaining an output voltage of the inverter and increasing an output frequency until a second ratio reaches a first ratio when the first ratio corresponding to a frequency relative to a predetermined voltage is greater than the second ratio corresponding to the rotor speed relative to the induced voltage.

10. The method of claim 9, further comprising: increasing the output voltage and the output frequency of the inverter in response to the first ratio when the second ratio reaches the first ratio.

* * * * *